UNITED STATES PATENT OFFICE.

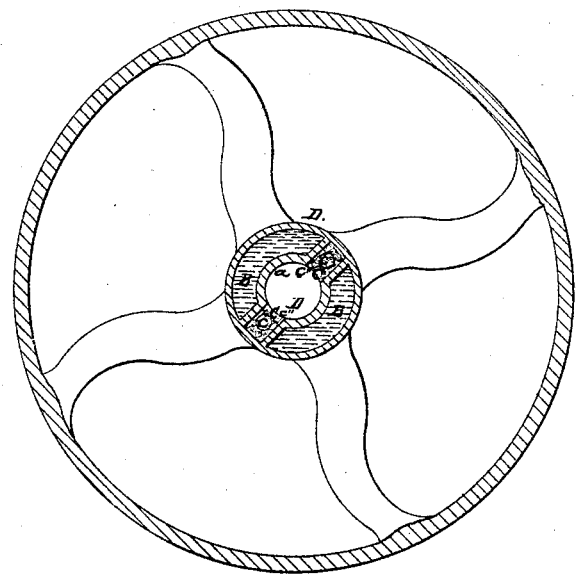
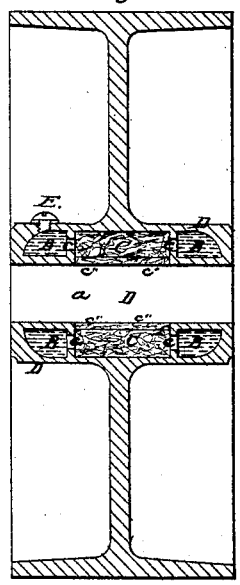

NORTON P. OTIS, OF YONKERS, NEW YORK.

IMPROVEMENT IN LOOSE PULLEYS.

Specification forming part of Letters Patent No. 51,077, dated November 21, 1865.

*To all whom it may concern:*

Be it known that I, NORTON P. OTIS, of Yonkers, in the county of Westchester and State of New York, have invented a new and useful Improvement in Loose Pulleys; and I do hereby declare that the following is a full, clear, and exact description of the same, reference being had to the accompanying drawings, forming a part of this specification, in which—

Figure 1 is a section parallel with the plane of revolution of a pulley with my improvement. Fig. 2 is an axial section of the same.

Similar letters of reference indicate corresponding parts in both figures.

The invention consists in making a loose pulley self-lubricating, by coring out the hub in such manner as to form within it an annular chamber or cavity, entirely surrounding the bore, and serving as a reservoir to contain oil or other lubricating material, and in a certain arrangement of supply chambers and passages forming communication between the said reservoir and the bore, for the gradual supply of the lubricating material to the bore through cotton wick or other capillary material contained in the said supply chambers or cavity, which serves as a reservoir to contain oil or other lubricating material, and forming a communication between the said chamber, cavity, or reservoir and the bore of the pulley by means of supply-chambers containing wick or other fibrous or capillary material.

To enable others to make and apply my invention, I will proceed to describe it with reference to the drawings.

A is the hub of the pulley, cored out to form around the bore $a$ the annular chamber or cavity B, which constitutes the reservoir for the oil or lubricating liquid. This chamber or reservoir has no direct communication with the bore of the hub; but a communication is formed between it and the bore through one or more chambers, C C, which I term "supply-chambers," partitioned off within the hub from the said chamber or reservoir B by coring the hub in a suitable manner. These supply-chambers have openings $c\ c$ in their sides or ends, communicating with the reservoir B, and openings $c''\ c''$, communicating with the bore $a$ of the hub, and are intended to be filled, or partly filled, with wick or other fibrous or capillary material, which is also inserted into the openings $c\ c$ to draw the oil from the reservoir by capillary attraction and supply it in moderate quantity between the bore of the pulley and the shaft which carries it. A hole is provided in the outer shell of the hub for the introduction of the oil into the chamber B, and when the chamber is filled the said hole is closed by a screw-plug, or other stopper, E. Every time the belt is thrown off the loose pulley, and the said pulley becomes stationary, or nearly so, the oil is supplied in suitable quantity from the supply-chambers C between the bore and the shaft; but while the belt is on the loose pulley and the said pulley is in motion the centrifugal force imparted to the oil in the chambers throws it outward from the bore and shaft and stops the supply through the openings $c\ c$. The quantity supplied while the pulley is at rest will be sufficient to last during the time the belt is on, and if it were not checked or stopped during the time the pulley was running it would be too great.

What I claim as my invention, and desire to secure by Letters Patent, is—

The supply-chambers C C, containing wick or other capillary material, and the openings or passages $c\ c$ and $c''\ c''$, in combination with the annular chamber B, the whole arranged within the hub, substantially as and for the purpose herein specified.

NORTON P. OTIS.

Witnesses:
 CHARLES R. OTIS,
 WM. A. WILSON.